(12) United States Patent
Chenel

(10) Patent No.: US 6,354,029 B1
(45) Date of Patent: *Mar. 12, 2002

(54) PAINTED, FLEXIBLE, TEMPORARY DECORATIVE SURFACE, INTENDED IN PARTICULAR TO BE EXPOSED IN A STRETCHED STATE, OUT OF DOORS, SUCH AS DECORATIONS OUTSIDE BUILDINGS AND SIGNS

(76) Inventor: Gilbert Guy Chenel, 1 rue Marcel Loyau, 92100 Boulogne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/690,397

(22) Filed: Oct. 17, 2000

Related U.S. Application Data

(63) Continuation of application No. 08/958,014, filed on Oct. 27, 1997.

(51) Int. Cl.$^7$ ............................. G09F 19/00; B32B 9/00
(52) U.S. Cl. ........................ 40/584; 101/483; 428/195
(58) Field of Search ......................... 40/360, 584, 603, 40/604, 618; 101/483; 428/195

(56) References Cited

U.S. PATENT DOCUMENTS

| | | | |
|---|---|---|---|
| 4,813,948 A | 3/1989 | Insley | 604/366 |
| 4,921,645 A | 5/1990 | Insley | 264/6 |
| 5,364,681 A | 11/1994 | Pate et al. | 428/137 |
| 5,458,590 A | 10/1995 | Schleinz et al. | 604/361 |
| 5,515,779 A | 5/1996 | Danby | 101/129 |
| 5,520,112 A | 5/1996 | Schleinz et al. | 101/483 |
| 5,526,748 A | 6/1996 | Schleinz et al. | 101/488 |
| 5,545,464 A | 8/1996 | Stokes | 428/198 |
| 5,562,037 A | 10/1996 | Schleinz et al. | 101/483 |
| 5,566,616 A | 10/1996 | Schleinz et al. | 101/483 |
| 5,597,642 A | 1/1997 | Schleinz et al. | 428/195 |
| 5,612,118 A | 3/1997 | Schleinz et al. | 428/195 |
| 5,632,844 A | 5/1997 | Pate et al. | 156/290 |
| 5,681,408 A | 10/1997 | Pate et al. | 156/71 |
| 5,759,926 A | 6/1998 | Pike et al. | 442/333 |
| 5,876,551 A | 3/1999 | Jackson | 156/307.4 |
| 5,895,710 A | 4/1999 | Sasse et al. | 442/334 |
| 5,935,883 A | 8/1999 | Pike | 442/340 |
| 6,169,045 B1 * | 1/2001 | Pike et al. | 442/352 |
| 6,209,244 B1 * | 4/2001 | Chenel | 40/584 |

FOREIGN PATENT DOCUMENTS

| | | | |
|---|---|---|---|
| AU | 646979 | 4/1993 | 40/584 |
| EP | 0 287 077 | 10/1988 | |
| EP | 0 357 018 | 3/1990 | |
| EP | 0 691 210 | 1/1996 | |
| EP | 0 704 315 | 4/1996 | |

OTHER PUBLICATIONS

Database WPI, Week 9245, Derwent Publications Ltd., GB, AN 92–369587 & JP 04 270 679 (Komatsu Seiren KK), Sep. 28, 1992.

Database WPI, Week 9524, Derwent Publications Ltd., GB, AN 95–182624 & JP 07 101 022 (Toray Ind Inc.), Apr. 18, 1995.

Patent Abstracts of Japan, vol. 011, No. 136, Apr. 30, 1987 & JP 61 272277 (Canon Inc.) Dec. 2, 1986.

Patent Abstracts of Japan, vol. 017, No. 433, Aug. 11, 1993 & JP 05 096669 (Dynic Corp.), Apr. 20, 1993.

* cited by examiner

Primary Examiner—Robert G. Santos
(74) Attorney, Agent, or Firm—Drinker Biddle & Reath LLP

(57) ABSTRACT

"Painted, flexible, temporary decorative surface, intended in particular to be exposed in a stretched state, out of doors, such as decorations outside buildings and signs"
Surface comprising
  a substrate of a nonwoven material
  a decoration produced on the substrate by automatic projection of ink.

2 Claims, 1 Drawing Sheet

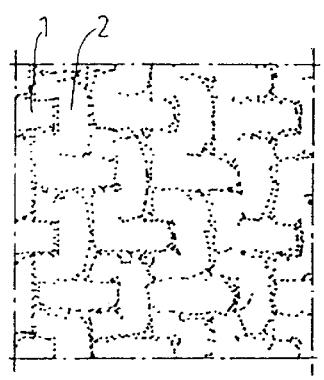
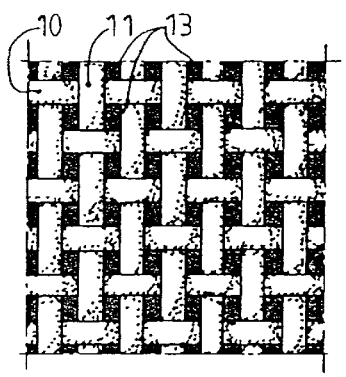
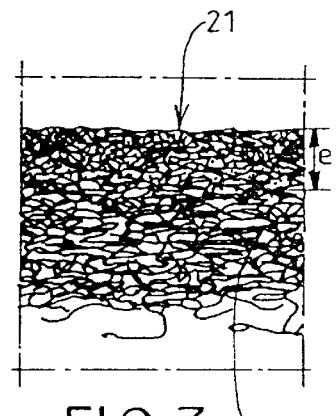
FIG.1A  FIG.2A  FIG.3
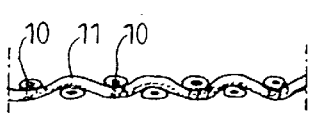
FIG.1B  FIG.2B
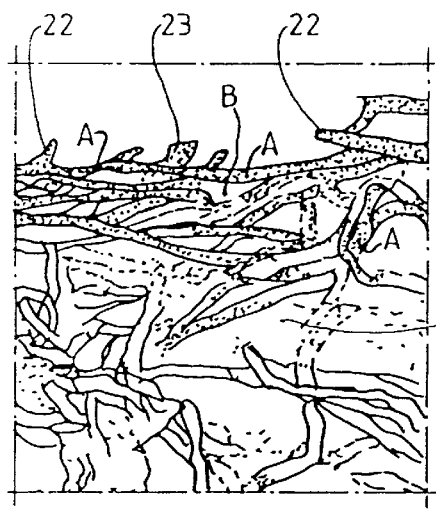
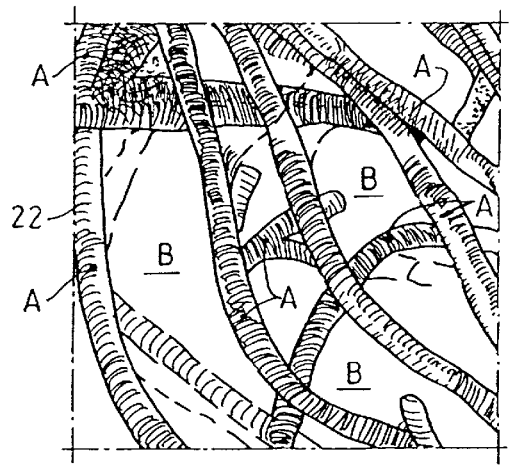
FIG.4  FIG.5

PAINTED, FLEXIBLE, TEMPORARY DECORATIVE SURFACE, INTENDED IN PARTICULAR TO BE EXPOSED IN A STRETCHED STATE, OUT OF DOORS, SUCH AS DECORATIONS OUTSIDE BUILDINGS AND SIGNS

This is a continuation of copending application(s) Ser. No. 08/958,014 filed on Oct. 27, 1997 which is incorporated herein by reference in its entirety.

The present invention relates to a painted, flexible, temporary decorative surface, intended in particular to be exposed in a stretched state, out of doors, such as decorations outside buildings and signs.

Such decorative surfaces in the form of large multicoloured decorations carrying information or advertising and produced on textile supports stretched vertically on scaffolding or directly on buildings are increasingly to be seen in towns. In the same way, also, giant signs or banners are produced to publicize temporary events. They are generally and often inaccurately called "painted canvases", a generic term that will be retained in the description which follows.

The production of these "painted canvases" raises two principal types of problem:

the mechanical strength of the canvases, graphical reproduction on the canvases.

The forces exerted by the wind and borne by the canvases increase with their surface area, their degree of impermeability to air and the level of exposure of their location. More specifically, the effects of pressure drops, may, in bad weather, transmit considerable tearing forces to the anchoring points of the canvases, situated at their periphery. Furthermore, these productions being temporary, some makers, for reasons of economy, gamble on the low probability of experiencing a storm and disregard these risks.

In the present state of the art, for their production, professionals use the following materials:

strong textile canvases coated with PVC (FIGS. 1A and 1B), reinforced or unreinforced strong and very lightweight fabrics, of the type of "spinnaker cloth", customarily used on racing yachts, nets of strong threads, continuously coated with a plastic film, strong textiles of the type comprising an open mesh blocked by a coating, strong, more or less open fabrics, not blocked by a coating (FIGS. 2A and 2B).

It should be noted that:

the first three types of canvas have continuous surfaces that are not permeable to air, and therefore necessarily have to be very strong.

The last-named two types of canvas, specifically created to reduce the effects of the wind, have a surface pierced by the multiplicity of apertures resulting from the loose weave (for example: 22% of apertures in the textile shown in FIG. 2A).

The methods currently used for graphic reproduction on the canvases are:

direct painting with a brush, silk-screen printing, painting with a manual spray-gun, application of precut elements, usually comprising sheets of adhesive-coated coloured vinyl, ink microjets applied with automatic machines, for example in four-colour printing.

Whatever may be the nature of the canvas:

the first two reproduction techniques deposit relatively thick films of paint or ink, forming air-impermeable surfaces on the canvases, since the paints generally block the apertures in the canvases;

painting with a conventional manual spray-gun, as well as not permitting complex reproductions to be achieved economically, projects relatively large droplets which block a large proportion of the pores of the permeable canvases;

in general terms, paint or thick inks form films stretched between the fibres of the canvas; these films block the orifices and reduce the permeability of the canvas;

the application of precut elements of coloured vinyl renders the canvas completely impermeable at the locations where such elements are applied;

the "ink microjet" technology, using micro-droplets that are automatically precision-projected, allows any apertures in the canvases to be left free, preserving their permeability to air, since the ink usable with such apparatus has to be extremely fluid, in a manner such that the microdroplets can only be deposited on the fibres of the fabric of the canvas. In this case, however, there is the disadvantage that the fidelity of reproduction is reduced since the surface area available for graphics is reduced by the surface area of the apertures in the fabric of the canvas.

To summarize, in the present state of the art, painted canvases such as decorations and signs giving satisfactory graphic definition are impermeable to air, while those which are permeable to air give reduced-contrast graphical reproduction.

The object of the present invention is to remedy these disadvantages with the proposed creation of a painted canvas or painted decorative surface offering excellent graphic definition while being very permeable to air in order to avoid undergoing and transmitting considerable stresses at the attachment points.

To this end, the invention relates to a decorative surface of the type defined above, characterized in that it comprises:

a substrate made from a fire-resistant, highly airpermeable, nonwoven material, a decoration produced on the substrate by automatic projection of ultrafine inks.

The "nonwoven" material has a structure related to that of felts or products used to form filters. These flexible and permeable nonwoven materials, which are available in large machine widths and fire-resistant, have a thickness of about 1 to 2 mm and a microstructure which is aerated in three dimensions, by contrast with loose fabrics, nets and textile meshes which may be equated with two-dimensional structures.

The structure of a nonwoven material of the "filter" type is a lap formed of a multitude of microfibres, of a diameter of about 10 microns, randomly distributed, oriented in all directions and interwoven. These fibres occupy the bulk of the lap, leaving passages which allow fluids to pass through the lap from one surface to the other. However, such a lap is not transparent. A ray of light cannot pass through it since, statistically, it offers no rectilinear passage passing from one surface to the other of the lap (whatever may be the inclination of the ray relative to the lap). However, this lap is translucent, light passing through it by way of multiple diffraction, following paths that are very schematically similar to those followed by fluids undergoing filtration.

The nonwoven materials may be composed so that their features of permeability and fire-resistance, and also of their mechanical strength, are adapted to the invention by modification of their composition and/or mode of manufacture. For example, a technique for the manufacture of nonwovens exists which increases their strength in one of the two directions of their plane, a specialized variation which may be useful for certain canvases.

By automatic projection of microdroplets (ink microjets) using extremely fluid inks, microdroplet ink jets are formed. These microdroplets become caught on the apparent surface of the fibres of the lap of nonwoven material.

Such microdroplets are not diverted from their trajectory, so they adhere to the fibres as they encounter them. This gives an extremely continuous aspect when viewed from the front (as regards the line produced by a single jet of coloured ink).

The lines left by the jets of the various coloured inks are superposed as a function of the gradations of the design to be produced.

In other words, by virtue of the "non-transparency" of the lap of nonwoven material, the ink droplets will, statistically, always encounter a fibre in the course of their trajectory and create a dot of colour.

The impression given when viewed from the front, therefore, will be a line identical to that which would be left by the microjet on a planar surface, for example a sheet of paper.

Because of their extremely small dimensions, these microjets only become caught or fixed on one fibre, without forming a veil between a plurality of fibres. Hence, there is no risk of partial obstruction of the free passages between the fibres since, after the passing of the microjet, the structure of the lap of nonwoven material is entirely preserved, the only modifications being the spots of colour borne by the fibres.

The permeability of the lap is thus virtually entirely preserved.

Graphical reproductions by ink microjets can be produced, for example, in four-colour printing; the microjets move perpendicularly and successively to the surface of the lap.

The lines of colour left by the microdroplets projected by the microjets thus give an impression of visual continuity in graphical reproduction, allowing very great precision of reproduction and very great fineness of detail. The graphical precision is likewise improved because the projection of the jets takes place in a constant direction (which is generally perpendicular to the surface of the lap of nonwoven material), and the microjets are at no risk of being diverted because the droplets are so fine that they lack sufficient kinetic energy; when the droplets encounter the surface of a fibre, they become deposited thereon.

In other words, there is no lateral dispersion but only dispersion along a path perpendicular to the apparent surface of the nonwoven material.

According to the invention, it is likewise possible to produce pieces cut from permeable laps of nonwoven material of different shades and to attach them to a basic substrate which is likewise made from a permeable nonwoven material. The entire structure thus formed remains permeable to air.

The various techniques may be combined; it is possible to produce designs or coloured surfaces only on a portion of permeable nonwoven material in order to cut up these surfaces to appropriate shapes and attach them to a base lap of nonwoven material which is itself already differently coloured.

Another advantage of the coloured surface according to the invention is that it can be handled and rolled up without destroying the coloured surface:

In the case of a fabric which has received an application of paint, as already indicated above, the paint forms films which are caught between a plurality of fibres; when the canvas is distorted these films, which are generally dry and have become brittle, are destroyed.

By contrast, in the case of the surface according to the invention, as the fibres are surface-coloured but the paint does not form a film extending between a plurality of fibres, there is no film breakage and, consequently, no destruction of the image produced.

The colour rendition is likewise excellent, since, although the colours are applied to the surface of the fibres, the visual impression given by a lap of nonwoven material according to the invention is that of in-depth solution dyeing. As the body of the material is silky but not glossy, this considerably improves the aesthetic effect of the coloured surface. This effect is further enhanced by the translucent nature of the material of the lap, which diffuses light in the body of the material and thus creates illumination of the colours "in the body".

Once the canvas has been produced, the absence of gloss on the surface according to the invention avoids emphasis on the irregularities on the surface, and indeed understates them.

In general, the painted surface according to the invention has many advantages:
  reduction of the cost of producing support frames by virtue of reduced wind effect,
  reduction of the weight of the canvases (by more than 50%),
  reduction of the costs of purchase, transportation and installation,
  increase in the quality of graphical reproduction,
  improvement of the appearance by the elimination of gloss,
  improved safety,
  greater ease of installation.

The present invention will be described below in a more detailed manner, with reference to the attached drawings, in which:

FIG. 1A is a view on an enlarged scale (fourfold enlargement) of a surface of a fabric coated with PVC and forming an impermeable coated canvas.

FIG. 1B is a longitudinal section through FIG. 1A,

FIG. 2A shows a permeable fabric, enlarged fourfold,

FIG. 2B is a schematic cross-section of the fabric in FIG. 2A,

FIG. 3 shows a sectional view of a lap of nonwoven material, enlarged twentyfold.

FIG. 4 is a sectional view, similar to that in FIG. 3, of a nonwoven lap according to the invention, shown in a two hundred-fold enlargement.

FIG. 5 again shows the lap according to the invention with a six hundred-fold enlargement.

According to FIGS. 1A and 1B, a known canvas is formed by a weaving of weft threads 1 and warp threads 2, which are shown only in faint lines because they are covered by a coating of plastic material 3 (FIG. 1B).

FIG. 2A shows a canvas fabric formed of weft threads 10 and warp threads 11 leaving intervals 13 between them. Originally, such a fabric is permeable. The permeability is the percentage of the planar surface unoccupied by the threads 10, 11.

FIG. 2B shows, in section, the arrangement of the woven threads.

FIG. 3 shows a diagrammatic section on an enlarged scale (twentyfold) of a lap of unwoven material 20 whose front face 21 has received micro-drops of ink projected by automatic microjet machines.

The penetration of the droplets, because of "the opacity" of the lap of nonwoven material 20, lies within the surface layer e, which, for the sake of example, represents 0.5 mm.

FIG. 4, which is a section similar to that in FIG. 3 of a lap of nonwoven material according to the invention, but enlarged two hundred-fold, shows that the fibres 22, randomly interlocked, have received spots of coloured ink 23.

In fact, and as already explained above, the lap of nonwoven material being opaque, a jet of microdroplets (that is to say a group of microdroplets following mutually parallel trajectories which are, for example, perpendicular to the surface of the lap), will always encounter a surface of fibres 22 to become deposited thereon. The kinetic energy of the very small droplets, being extremely low, is not sufficient for the droplets to ricochet off the fibres and become diverted. To the contrary, they are deposited on the first fibre they encounter.

The enlarged view according to FIG. 5 (six hundred-fold enlargement) shows the lines of colour A produced on the fibres by the microdroplets of coloured ink.

This enlarged figure likewise shows the very high volume B left free between the fibres. This volume gives permeability to the lap.

The recent automatic "ink microjet" machines deposit extremely fluid inks, in four-colour printing, using four microjets in succession and perpendicularly to the surface of the substrates. In the case of the nonwoven used, the ink deposits are distributed over the microfibres in the upper part of the nonwoven, giving an impression of visual continuity in graphic reproduction while preserving the air-permeability of the substrate. It can be seen in FIGS. 3, 4 and 5, viewed in section, that the inks penetrate little into the thickness of the substrate and that they become deposited only on the microfibres (at A, FIGS. 4 and 5), virtually without thickening them and without obstructing the intervening spaces (B, FIGS. 4 and 5). The air permeability is thus retained. Experience also shows (FIG. 5) that, unlike impermeable canvases, these nonwovens allow superior definition of the ink-jet reproductions, because there is no lateral dispersion of the jet, but in-depth (about 0.5 mm) deposition of the ink droplets on the micro-fibres, following a trajectory perpendicular to the apparent surface of the nonwoven.

Another graphic reproduction technique also comprises making cut-outs from nonwovens of similar quality but different colours and fixing them on the initial substrate, without losing the air permeability of the whole.

It is to be noted that it would also be possible to combine the techniques, for example by using, for some graphic reproduction surfaces, applications that are significantly more impermeable to air, concurrently with the ink-jet. In this case, the scope of the invention will not be exceeded provided that the air-impermeable surfaces are smaller than the surfaces that remain permeable and are produced by ink microjets.

As nonwovens of this type can be handled, rolled and folded without impairing the graphic images, and then assembled and made up by stitching, adhesive bonding or even, in some cases, by welding, it will be possible to produce large decorative surfaces having a high graphic quality and, at the same time, a low wind resistance.

Moreover, the nonwovens of the "filter" type have a white, homogeneous and matt visual surface, highly compatible with the ink jet, unlike canvases coated with PVC which are semi-glossy, this being a defect because the gloss emphasizes the surface irregularities.

What is claimed is:

1. Painted, flexible, temporary decorative surface intended in particular to be exposed in a stretched state, out of doors, such as decorations outside buildings and signs, which comprises:

a substrate of air-permeable and fire-resistant nonwoven material having a microstructure which is aerated in three dimensions and is formed of a multitude of microfibers, randomly distributed, oriented in all directions and interwoven, occupying the bulk of the substrate;

a decoration produced on the fibers in the depth of the substrate by automatic projection of microdroplets of very fluid ink on the apparent surface of the fibers; and air-permeable surfaces cut from a nonwoven lap and fixed on the substrate of air-permeable nonwoven material.

2. Painted, flexible, temporary decorative surface, intended in particular to be exposed in a stretched state, out of doors, such as decorations outside buildings and signs according to claim 1, characterized in that the cut-out surfaces and/or the substrate are coloured by automatic projection of very fluid ink.

* * * * *